(12) United States Patent
Burch et al.

(10) Patent No.: US 8,789,295 B2
(45) Date of Patent: Jul. 29, 2014

(54) FOOTWEAR AND RELATED METHOD OF MANUFACTURE

(75) Inventors: John H. Burch, Belmont, MI (US); Gary J. Banik, Boulder, CO (US)

(73) Assignee: Wolverine World Wide, Inc., Rockford, MI (US)

( * ) Notice: Subject to any disclaimer, the term of this patent is extended or adjusted under 35 U.S.C. 154(b) by 842 days.

(21) Appl. No.: 13/023,182

(22) Filed: Feb. 8, 2011

(65) Prior Publication Data

US 2012/0198730 A1    Aug. 9, 2012

(51) Int. Cl.
| | |
|---|---|
| *A43B 23/00* | (2006.01) |
| *A43B 23/02* | (2006.01) |
| *B29D 35/14* | (2010.01) |
| *B29D 35/00* | (2010.01) |
| *B29D 35/02* | (2010.01) |

(52) U.S. Cl.
CPC .......... *A43B 23/0245* (2013.01); *A43B 23/024* (2013.01); *A43B 23/026* (2013.01); *A43B 23/0255* (2013.01); *B29D 35/148* (2013.01); *A43B 23/0235* (2013.01); *A43B 23/0215* (2013.01); *B29D 35/0009* (2013.01); *B29D 35/02* (2013.01); *B29D 35/146* (2013.01)
USPC .................... 36/45; 36/46.5; 36/48; 12/146 C

(58) Field of Classification Search
CPC .... B29D 35/146; B29D 35/148; B29D 35/04; B29D 35/126; B29D 35/02; A43B 23/0245; A43B 23/0215; A43B 23/0235; A43B 23/024; A43B 23/0255; A43B 23/026
USPC ........ 36/45, 46.5, 48, 49, 3 R, 3 A; 12/146 C, 12/145
See application file for complete search history.

(56) References Cited

U.S. PATENT DOCUMENTS

| 1,952,628 | A | * | 3/1934 | MacDonald | ........................ 36/4 |
|---|---|---|---|---|---|
| 2,034,091 | A | | 3/1936 | Dunbar | |

(Continued)

FOREIGN PATENT DOCUMENTS

| CA | 2634260 | 7/2007 |
|---|---|---|
| CN | 1342046 | 3/2002 |

(Continued)

OTHER PUBLICATIONS

PCT/US2011/061640 International Search Report, May 31, 2012.

(Continued)

*Primary Examiner* — Ted Kavanaugh
(74) *Attorney, Agent, or Firm* — Warner Norcross & Judd LLP

(57) ABSTRACT

A method for manufacturing footwear including injection molding a polymeric material on a sheet of material in preselected locations and/or in a preselected pattern so that the polymeric material bonds to the sheet and forms a structural exoskeleton of an upper of the footwear. The upper can be joined with a sole. The polymeric material can be injection molded on the sheet while the sheet is in a planar or flat configuration, and subsequently, the sheet and bonded exoskeleton can be conformed to a three-dimensional configuration of an upper. Additional polymeric materials can be injected on the exoskeleton to reinforce certain areas of the same. The exoskeleton can define one or more holes through which the sheet is visible to form one or more aesthetic regions on the upper. An article of footwear constructed with the method is also provided.

21 Claims, 11 Drawing Sheets

(56) References Cited

U.S. PATENT DOCUMENTS

| | | | |
|---|---|---|---|
| 2,622,052 | A | 12/1952 | Chandler |
| 3,504,450 | A | 4/1970 | Steadman et al. |
| 3,525,165 | A | 8/1970 | Randall |
| 3,605,294 | A * | 9/1971 | Cunningham .................... 36/45 |
| 3,650,051 | A | 3/1972 | Sass |
| 4,232,458 | A | 11/1980 | Bartels |
| 4,447,967 | A | 5/1984 | Zaino |
| 4,693,021 | A | 9/1987 | Mazzarolo |
| 4,704,808 | A | 11/1987 | Bianchini et al. |
| 4,785,558 | A | 11/1988 | Shiomura |
| 5,437,112 | A | 8/1995 | Johnston |
| 5,511,323 | A | 4/1996 | Dahlgren |
| 5,647,150 | A | 7/1997 | Romanato et al. |
| 6,216,366 | B1 | 4/2001 | Donnadieu |
| 6,233,845 | B1 | 5/2001 | Belli |
| 6,299,962 | B1 | 10/2001 | Davis et al. |
| 6,533,885 | B2 | 3/2003 | Davis et al. |
| 7,047,668 | B2 | 5/2006 | Burris et al. |
| 2002/0071946 | A1 | 6/2002 | Norton et al. |
| 2005/0268497 | A1 | 12/2005 | Alfaro et al. |
| 2006/0017195 | A1 | 1/2006 | Yang |
| 2006/0048413 | A1 | 3/2006 | Sokolowski et al. |
| 2006/0107552 | A1 | 5/2006 | Clark et al. |
| 2006/0283042 | A1 | 12/2006 | Greene et al. |
| 2007/0180730 | A1 | 8/2007 | Greene et al. |
| 2007/0199210 | A1 | 8/2007 | Vattes et al. |
| 2007/0245595 | A1 | 10/2007 | Chen et al. |
| 2009/0183392 | A1 | 7/2009 | Shane |
| 2009/0313853 | A1 | 12/2009 | Tadin |
| 2010/0139122 | A1 | 6/2010 | Zanatta |
| 2011/0258881 | A1 * | 10/2011 | Mateo ............................ 36/114 |
| 2012/0180340 | A1 | 7/2012 | Crowley, II et al. |
| 2012/0180341 | A1 | 7/2012 | Crowley, Ii et al. |
| 2012/0180344 | A1 | 7/2012 | Crowley, II et al. |

FOREIGN PATENT DOCUMENTS

| | | |
|---|---|---|
| CN | 1829455 | 9/2006 |
| EP | 0342462 | 11/1989 |
| EP | 1230867 | 8/2002 |
| EP | 1430803 | 6/2004 |
| WO | 90/03744 | 4/1990 |
| WO | 2005014268 | 2/2005 |

OTHER PUBLICATIONS

PCT/US2011/061640 Written Opinion, May 31, 2012.
EP 11157543 Partial European Search Report dated Oct. 14, 2013.

* cited by examiner

FOOTWEAR AND RELATED METHOD OF MANUFACTURE

BACKGROUND OF THE INVENTION

The present invention relates to footwear, and more particularly, to a method for manufacturing footwear with minimal labor input.

Over the years, footwear components, technology and functionality have evolved substantially. For example, footwear has become more technical and better suited to functioning precisely as desired by wearers. A problem that has plagued the manufacture and assembly of footwear for centuries, however, still remains. The problem is that making and assembling footwear is a labor intensive process. Indeed, over time, footwear manufacture has driven the industry across the world in search of inexpensive labor.

Footwear typically requires substantial labor input on multiple levels. For example, most footwear includes an upper constructed from multiple individual pieces of material. Those pieces of material are cut from stock material. Then they are modified in thickness for the footwear. Then they are joined with one another typically by stitching or cementing to form a three-dimensional upper. The pieces of the upper are also shaped over a last to better define the shape of the upper. After the external pieces of the upper are assembled, a liner typically is then joined with them, again with more stitching or gluing. If the footwear is to include laces, eyelets must be formed on the upper as well. In another step, an outsole is glued or stitched to the upper.

All of the foregoing steps require substantial labor input. Moreover, the amount of labor required is compounded by the fact that every time a new footwear design, style, or size is desired, the manufacturing method must be retooled to accommodate the variations. Unfortunately, while many have tried to address the labor intensity issues concerning footwear, they remain as much a problem now as they did at the turn of the century.

Some manufacturers have addressed the labor intensity of footwear by consolidating the components of an upper. This upper extends from heel to toe, and can be stitched together along a stitch line in the heel, which can reduce labor for stitching. The upper is decorated by embossing the upper material so that it mimics the conventional parts of a shoe. These embossed, discernable parts are painted to further visually separate them from other components, and so that the upper has more character than a simple monolithic-looking body.

The issue with the foregoing construction, however, is that if the material used to construct the upper is not rigid enough it typically lacks structural integrity, and a wearer will feel like they do not have enough support. On the other hand, if the material used to make the upper is too rigid, it is inflexible, and can potentially harm the wearer's foot. Further, because the components are only embossed or painted on the footwear, upon closer inspection, the resultant product can suffer aesthetically.

Accordingly, there remains much room for improvement to provide a footwear and a related manufacturing method that reduce the amount of labor and time input, that decreases pattern retooling costs and time, that is generally flexible to accommodate multiple patterns and sizes of footwear.

SUMMARY OF THE INVENTION

A method for manufacturing footwear is provided, where the method includes molding a polymeric material on a sheet of material in preselected locations and/or in a preselected pattern, so that the polymeric material bonds to the sheet and forms a structural exoskeleton, and configuring the sheet and exoskeleton to form a three-dimensional upper. The upper can be joined with a sole to form the completed footwear.

In one embodiment, the exoskeleton is bonded to the sheet of material while the sheet is in a two-dimensional form, that is, generally laying in a single plane. The exoskeleton can bond mechanically and chemically to the surface of the sheet.

In another embodiment, multiple polymeric materials can be bonded to the sheet or the polymeric material of the exoskeleton. For example, in one step, a first polymeric material can be injection molded on the sheet to form the exoskeleton. In another step, a second polymeric material can be injection molded over a portion of the exoskeleton and/or the sheet.

In still another embodiment, the first and second polymeric materials can be different. For example, they can be different colors and/or can have different densities, durometers, chemical properties, melting points, rip characteristics, tensile strengths and the like.

In yet another embodiment, the first polymeric material can be molded on the sheet in a first mold, and the sheet and resulting exoskeleton can be removed from the first mold and placed in a second mold. There, a second polymeric material can be molded on the exoskeleton and/or the sheet to form an additional layer.

In even another embodiment, the exoskeleton can be molded so that it is raised above the upper surface of the sheet a predetermined thickness. This predetermined thickness can vary from region to region of the exoskeleton depending on the desired attributes, such as rigidity, flexibility or support in a particular areas of the footwear.

In still yet another embodiment, the exoskeleton can define one or more holes through which the sheet is visible to form one or more aesthetic regions on the upper. The aesthetic regions can be sized so that an aesthetic region is at least one square centimeter in size. With this size aesthetic regions, the upper surface of the sheet can be readily visible to a viewer of the footwear. Certain colors, designs, indicia, textures, text or other readily perceptible features can be included within the aesthetic region.

In a further embodiment, the exoskeleton can be formed to provide specific structural components of an upper of the footwear. For example, the exoskeleton can define footwear components, such as a toe box, an ankle collar, an eyelet cradle, a quarter strap, a heel counter, a lower trim runner, and/or combinations of the foregoing. These elements can be visually separated from one another by one or more aesthetic regions located generally between the elements. If desired, the aesthetic regions can accentuate the transition of one element to another.

In still a further embodiment, the method can include placing a sheet of material on a last to conform sheet to three-dimensional contours of the last, thereby forming a three-dimensional upper; placing a mold adjacent the last with the sheet located between the last and the mold; injection molding a polymeric material between the mold and the sheet so the polymeric material bonds to the sheet while the sheet is in the form of the three-dimensional upper, where the polymeric material forms an exoskeleton, with aesthetic regions visible through holes defined by the exoskeleton.

In yet a further embodiment, an article of footwear is provided. The footwear can be constructed from a sheet and an exoskeleton joined with the sheet. The exoskeleton can provide structural reinforcement and/or three-dimensional shape to the sheet so the sheet and exoskeleton form a three-dimensional upper. To the upper, a sole can be joined to provide a finished footwear construction.

The method of manufacturing footwear described herein provides a labor- and time saving process by which to make footwear. Where the upper is constructed by injection molding an exoskeleton on a base sheet, and these elements are reconfigured to produce a three-dimensional upper, significant assembly and processing time and labor costs can be saved. Further, multiple labor intensive steps of joining various conventional components of an upper can be eliminated, in some cases leaving only a step of producing one seam. In addition, where the footwear is designed to be waterproof, such a single seam design can make it easier to seal the footwear. Moreover, with the simplicity and efficiency of the present method, pattern retooling costs and time become much more flexible. As a result, the method can accommodate multiple patterns and sizes of footwear. Finally, with the above mentioned reduction in labor and processing, the present methods lend themselves to implementation in small, micro-manufacturing facilities so that an insubstantial workforce can produce a high volume of footwear.

These and other objects, advantages and features of the invention will be more readily understood and appreciated by reference to the detailed description of the embodiments and the drawings.

DETAILED DESCRIPTION OF THE CURRENT EMBODIMENTS

I. Overview

Figure 1:
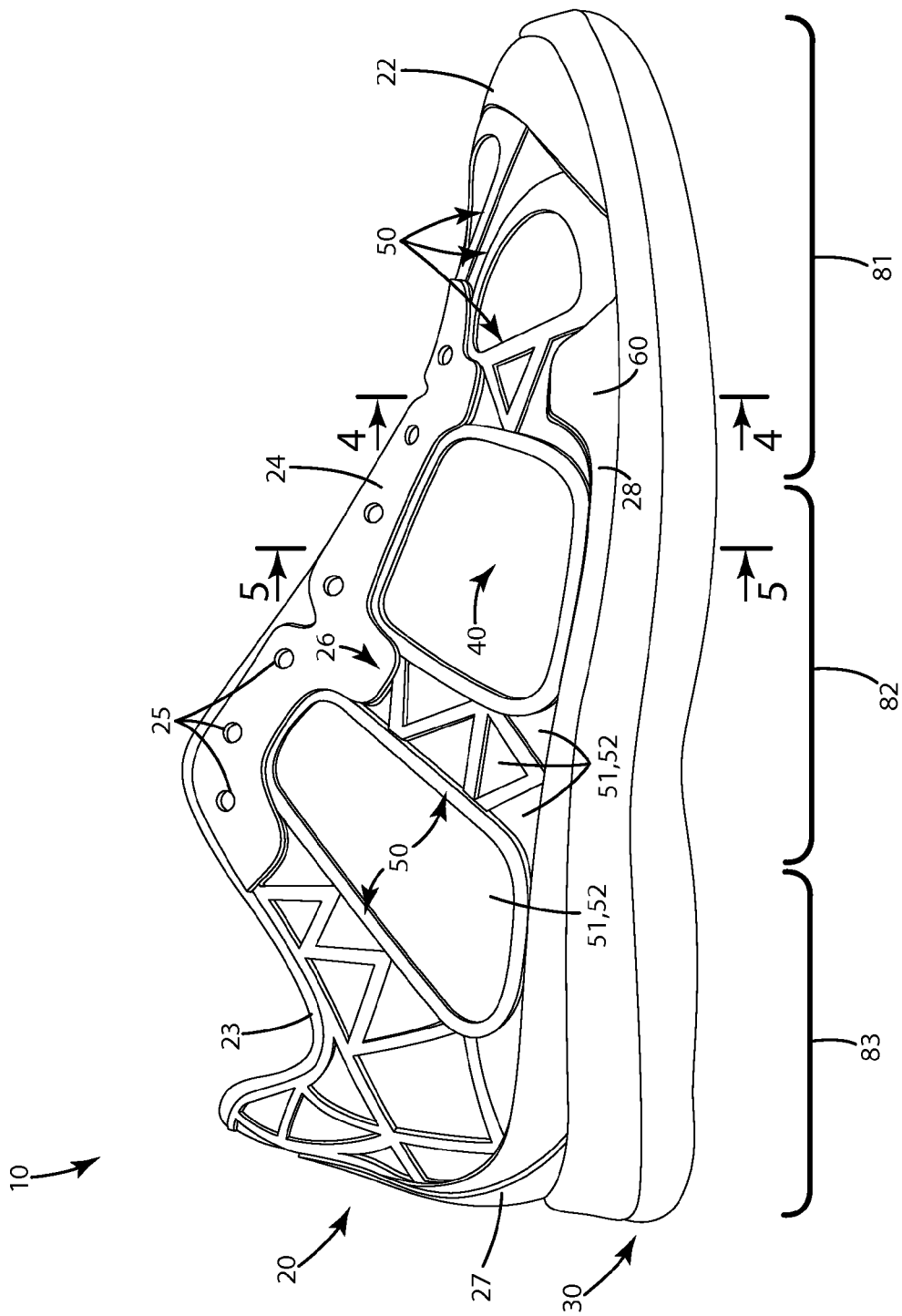
FIG. 1 is a side view of a current embodiment of the footwear.

A current embodiment of the footwear is shown in FIGS. 1-6 and generally designated 10. The footwear can include an upper 20 joined with a sole 30. The upper 20 can be constructed from a base material 40 and a exoskeleton 50. The exoskeleton can be bonded to the base material 40 in the method described below. The exoskeleton can define one or more apertures 51 through which the base material is visible and forms one or more aesthetic regions 52.

In general, a method for manufacturing the footwear is shown in FIGS. 6-9. There, the base material 40 is generally in the form of a flat sheet 42. The flat sheet can be in a substantially planar configuration lying in a single plane. The sheet can be placed in a mold 100. A polymeric material 50a can be injection molded at a molding pressure to form the exoskeleton 50. The exoskeleton 50 and more particularly the material 50a can embed in the base material 40 thereby bonding the exoskeleton to the sheet 42. The sheet and the exoskeleton, and any additional layers, can form substantially all of the upper 20, without having to add additional separate components. This simple upper can be taken from its two-dimensional flat form shown in FIG. 7 and placed on a last 109 shown in FIG. 11. The flat sheet 42 and exoskeleton 50 can be conformed to the three-dimensional contour of the last to form a three-dimensional upper. The sole 30 can then be joined with the upper 20 to complete the footwear. Additional items such as lacing straps, closure mechanisms, and loops can be added to the footwear.

With this method, footwear can be manufactured with only a few steps and a small number of components. In turn, this can save assembly and/or construction time for the footwear, and in particular, the upper, which can lead to significant savings in labor and overall cost of the footwear.

For purposes of disclosure, the embodiments herein are described in connection with a casual footwear construction. As will be appreciated, the embodiments are also well suited for other types of footwear including but limited to athletic footwear, sandals, fitness footwear, work footwear, boots, outdoor footwear, walking footwear and multi-sport footwear. Further, as used herein, the term "arch region" (or arch portion) refers generally to the portion of the footwear corresponding to the arch of the wearer's foot; the term "forefoot region" (or forefoot portion) refers generally to the portion of the footwear forward of the arch region corresponding to the forefoot (e.g., including the ball and the toes) of a wearer's foot; and the term "heel region" (or heel portion) refers generally to that portion of the footwear rearward of the arch region corresponding to the heel of the wearer's foot. The forefoot region 81, arch region 82 and heel region 83 are generally identified in FIG. 1, however, it is to be understood that delineation of these regions may vary depending upon the configuration of the footwear.

II. Structure

The components of the footwear 10 will now be described in more detail. As shown in FIG. 1, the upper 20 can include a toe box 22, an ankle collar 23, and an eyelet cradle 24 that generally extends from the ankle collar toward the toe box. The ankle collar can generally surround at least a portion of the ankle of a wearer when the footwear is placed on a wearer. The toe box can generally form an enclosure for the toes. Of course, the upper can also include one or more quarters, including quarter straps 26, that extend generally from the eyelet cradle 24 downwardly toward the sole 30 in the completed footwear. The quarter straps 26 can provide lateral and medial support for the upper to assist in retaining its shape and providing support by wrapping around a wearer's foot. The quarter straps 26 can also transfer forces generated through lacing 70 when the same is included in the footwear 10.

The upper 20 can include a heel counter 27 and a rand or lower trim runner 28 that extends near a lower peripheral allowance 29 (FIG. 11) of the footwear 10. As shown, the heel counter 27 can be a full heel counter that extends across the substantial portion of the heel, or can include a framework defining holes that extends across the portion of the heel. The rand or lower trim runner 28 can be a supportive piece that extends adjacent the outsole.

Each of the above footwear components, which collectively make up the upper of the current embodiment, can be at least partially formed by both the exoskeleton 50 and the base material 40, or more generally the sheet 42. For example, the toe box 22 can be formed by the base material 40, with the exoskeleton 50 extending over all or a portion of the base material 40 within that component. Of course, as described below, the exoskeleton can form holes through which the base material 40 is visible to form one or more aesthetic regions 52 in the toe box.

Similarly, the quarter straps 26 can be formed from both the exoskeleton 50 and the underlying base material 40. Each quarter strap itself can extend from the eyelet cradle 24 to the lower trim runner 28, or where the lower trim runner is absent to the sole 30. Likewise, if the eyelet cradle is absent from the construction, the quarter strap 26 from one side of the footwear 10 can extend entirely over the top of the wearer's foot down the opposite side of the foot and connect to the sole on the opposite side.

The exoskeleton 50 can operate to provide structural support to the footwear, particularly in connection with the quarter strap. For example, due to the rigidity of the polymeric material from which the exoskeleton 50 is constructed, that exoskeleton 50 can physically, structurally support the base material 40 in the upright, generally three-dimensional configuration of the upper 20. Moreover, with respect to the quarter straps 26, the exoskeleton can transmit a tensioning or other force exerted on and by the laces 70, which is transferred through the eyelet cradle 24 to the sole 30 or lower portion of the upper 20. For example, when the laces 70 are tightened, forces are transmitted through the exoskeleton 50 via the eyelet cradle 24, and the quarter strap 26, to the sole 30 so that the footwear 10 can be tightened down and on a wearer's foot.

Optionally, in certain types of footwear, certain of the elements of the shoe components noted above can be absent. For example, in a sandal construction, the toe box, eyelet cradle and heel counter can be eliminated. In other constructions, such as a more boot-like construction, the ankle collar can extend upward around a wearer's lower leg. This extension can be constructed to include the exoskeleton and base material as with the other components.

Figure 9:
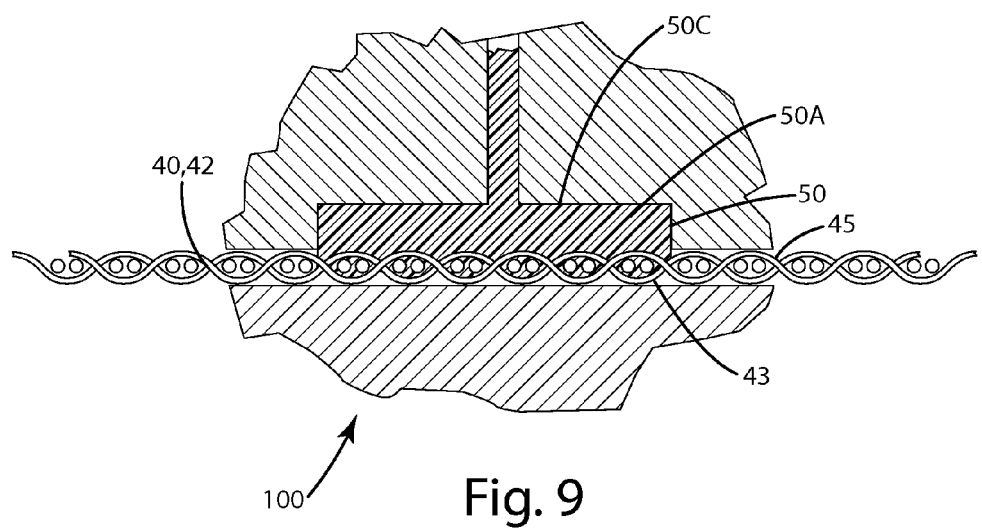
FIG. 9 is a close-up section view of the exoskeleton joining with the sheet in the first mold.

The base material 40, and more generally the base sheet 42, can be constructed from a variety of synthetic, natural or a combination of natural and synthetic materials. For example, the material can be woven or non-woven textiles including fibers and/or filaments, a mesh construction, a membrane construction, for example a water-resistant or water-proof membrane, such as Gore-Tex® or Sympatex®, natural or synthetic leathers, and combinations of the foregoing. Moreover, the base material can be combinations of the foregoing. For example, as shown in FIG. 9, the base material 40 and more generally the sheet 42, includes a woven material that is joined with an underlying backer material to form a membrane. In some embodiments, the base material 40/sheet 42 can be constructed from material or synthetic leather. In such embodiments, the exoskeleton embeds in and bonds well to the underlying base material/sheet.

Figure 2:
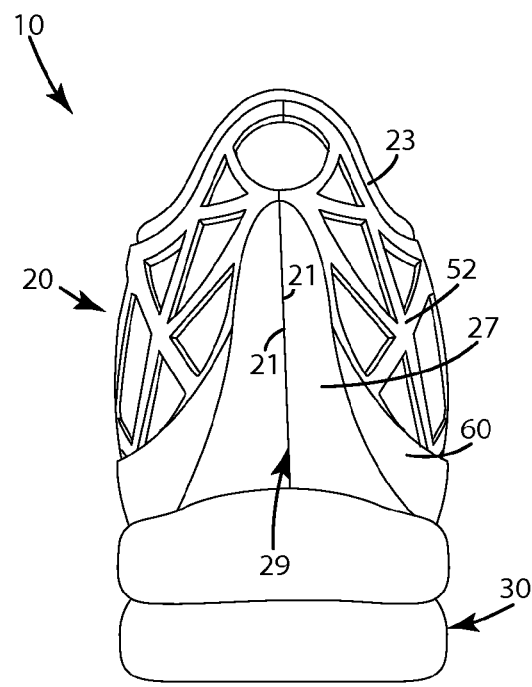
FIG. 2 is a rear view of the footwear.
Figure 3:
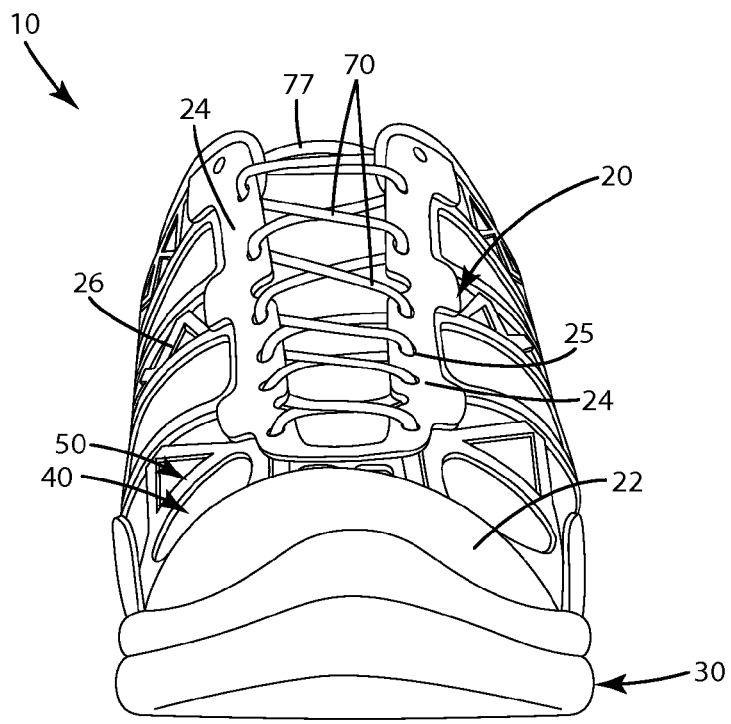
FIG. 3 is a front view of the footwear.
Figure 7:
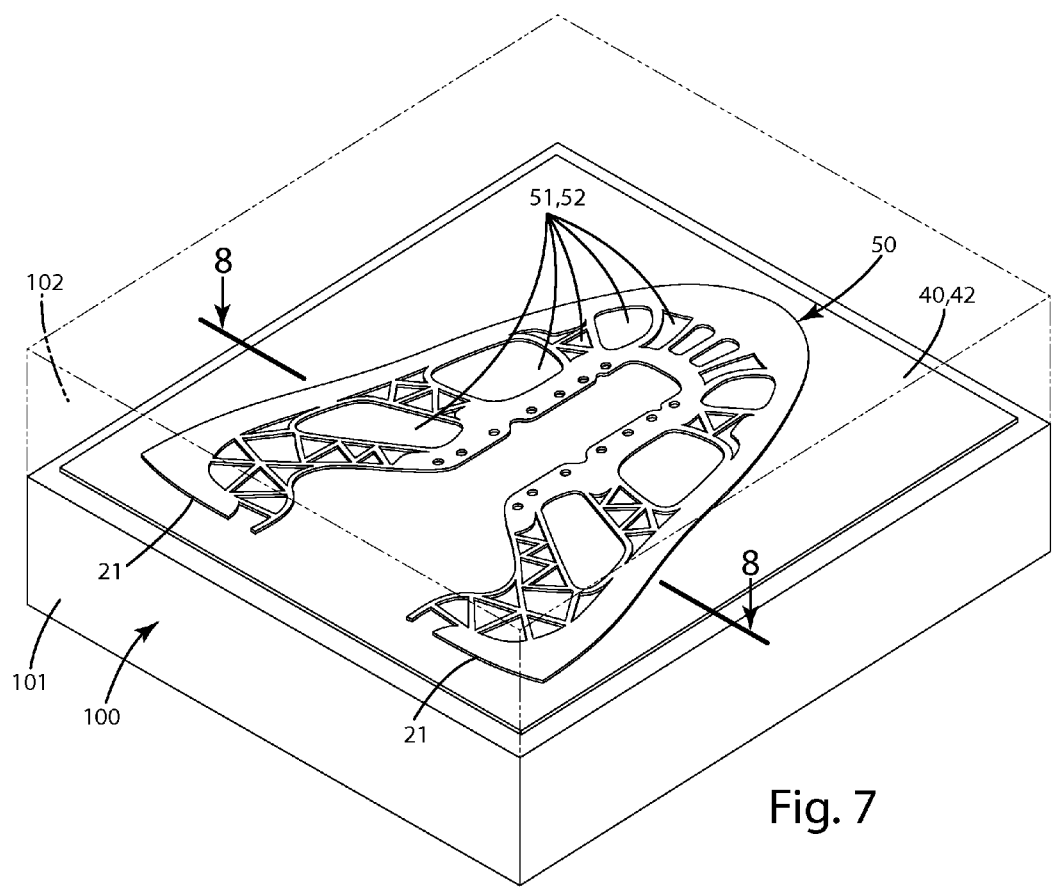
FIG. 7 is a perspective view of the exoskeleton being joined with the sheet.
Figure 8:
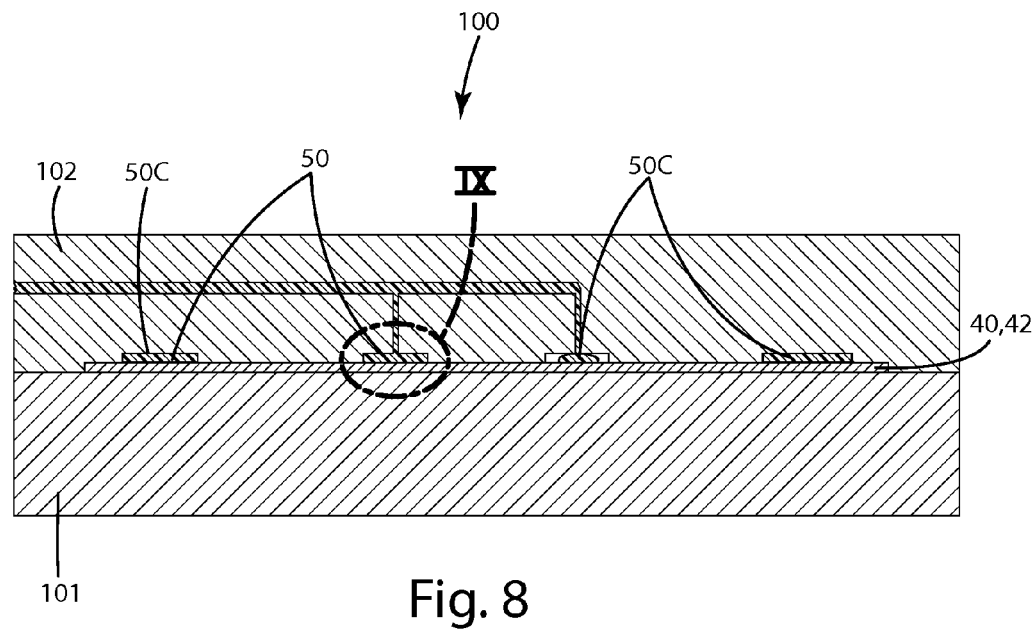
FIG. 8 is a section view of a first mold in which the exoskeleton is joined with the sheet.

It is noted that in the current embodiment, the upper 20 is a substantially continuous structure, with the base material 40 optionally extending through substantially every component. The exoskeleton is bonded to the base material 40 to structurally reinforce the base material 40 in each of the respective components. In so doing, the exoskeleton 50 can aesthetically further delineate the different components of the footwear. Where the upper is constructed generally from a contiguous base material 40 and associated exoskeleton 50, the upper 20 can be transformed from a flat configuration shown in FIGS. 7 and 10 to the three-dimensional configuration shown in FIG. 1 or FIG. 11 by joining the marginal ends 21 of the footwear together. As shown, these marginal ends 21 are located in the heel region 83 as shown in FIGS. 2 and 7. When these ends 21 are closed and joined together, they effectively, substantially close the upper, which means that the upper is closed enough to surround the user's foot, but optionally can remain open in the areas corresponding to the hole formed on the lower side of the upper, which is eventually covered by the sole 30 or a sock 33 liner, the ankle collar that accepts a wearer's ankle or lower leg, and optionally the hole coinciding with a tongue 77 of the footwear.

With reference to FIGS. 1 and 7, the marginal ends 21 of the upper can be joined as shown in the heel region 83, or optionally in other locations of the footwear 10 if desired. For example, the marginal ends could be formed in a quarter 26 of the upper 20, near the toe box 22, ankle collar 23, near the quarter straps 26, or in virtually any other location. The location can be selected so that when the base sheet 42 and its associated exoskeleton 50 are contoured over a last or otherwise formed from the generally two-dimensional, flat, planar orientation to a substantially three-dimensional upper, the ends can be positioned adjacent one another and joined to close the upper except optionally for one or more of the lower portion of the upper to be joined with the sole, the hole for the foot and the tongue. The marginal ends 21 can be joined in a variety of manners, including by stitching, cementing, gluing, sonic welding, radio frequency (RF) welding, or high frequency (HF) welding, or with any conventional fastener such as rivets, staples and the like. The three aforementioned welding techniques can be referred to generally as RF welding.

As used herein, when referring to the exoskeleton and base material/sheet forming substantially all of the three-dimensional upper, it is meant that one or both of these elements form a substantial part of the upper so that additional separate pieces or components of the upper generally are not added to these elements to form the upper. For example, the flat sheet and/or exoskeleton can form the toe box 22, ankle collar 23, eyelet cradle 24, quarters and quarter strap 26, heel counter 27 and lower trim piece 28, or various combinations of these elements depending on the type of footwear contemplated. Accordingly, a separate component, such as the separately constructed toe box or heel counter might not be sewn to the sheet 42 and/or exoskeleton 50 to complete the upper 20 because these components are already built into the upper. Of course, for certain types of footwear, for example, sandals, open toe footwear, and certain women's dress footwear, certain of these elements, like a toe box and/or heel counter may be absent from the upper but still fall within the contemplated construction where the exoskeleton and base material/sheet form substantially all of the three-dimensional upper. Further, the exoskeleton and/or base material/sheet can form substantially all of the three-dimensional upper even though certain additional ancillary elements, such as lacing, a tongue, heel loops or tongue loops, additional sock liners or internal layers, or seam covers or labels are also added to the upper 20.

Returning to FIGS. 4-6, the footwear 10 can include an upper joined with sole 30. The sole can include a midsole 31 which can be constructed from a cushioning material, such as ethyl vinyl acetate (EVA) or other suitable cushioning materials. The midsole can be covered by an outsole 32, and in particular, can be covered by the outsole in the forefoot 81, arch 82 and heel 83 regions. The outsole 32 and its portions can be manufactured from a relatively hard rubber or other sufficiently durable or wear resistant material. The bottom of the outsole 32 can include an outer surface 36 that forms the wearing surface of the outsole and can be contoured in a desired pattern. The outer surface 36 can be textured to provide traction from the heel to the forefoot if desired, or it can be compartmentalized to include specific tread patterns in certain regions of the footwear.

Figure 4:
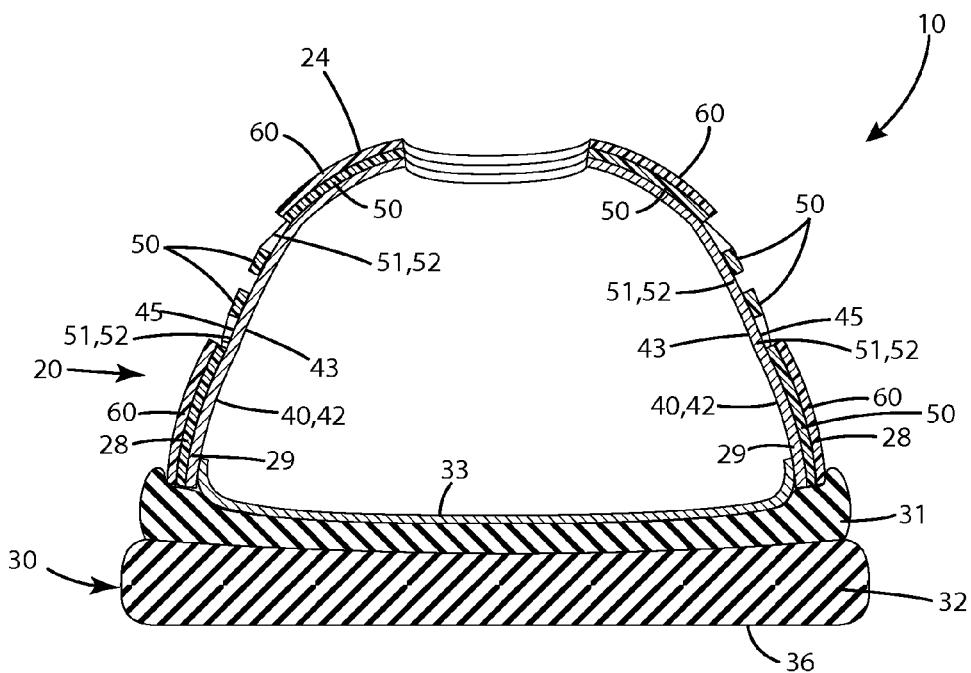
FIG. 4 is a section view of the footwear taken along line 4-4 of FIG. 1.
Figure 5:
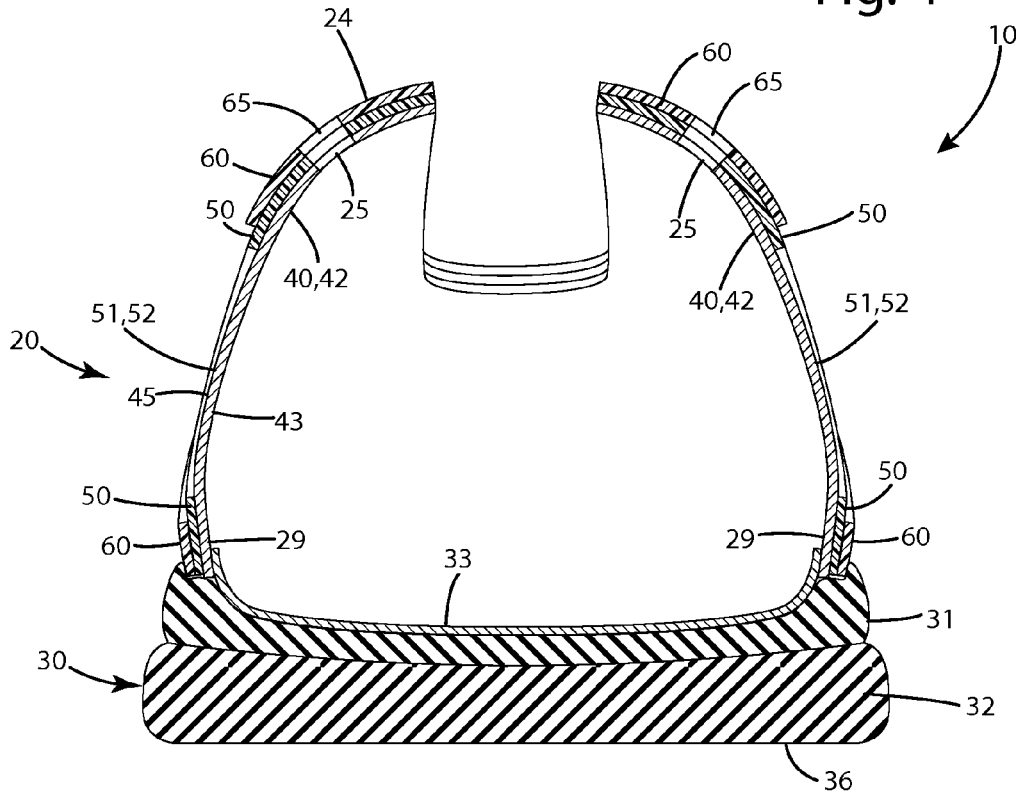
FIG. 5 is a section view of the footwear taken along line 5-5 of FIG. 1.

As also shown in FIGS. 4 and 5, the upper 20 can generally be closed at its lower portion which forms an opening to the cavity formed within the upper 20 where a user's foot is positioned when the footwear 10 is worn. The lower portion can be closed with a sock liner 33. The sock liner can be stitched with stitching, RF welded, cemented or otherwise fastened to a lower peripheral allowance 29 at the upper 20. As a specific example, the sock liner 33 can be Stroebel stitched to the peripheral allowance 29 to close the lower portion of the three-dimensional upper. The lower peripheral allowance 29 can include the base material 40 and/or at least a portion of the exoskeleton 50. Of course, if additional layers such as layer 60 shown in FIG. 4 is added over the exoskeleton and/or the base material, the peripheral allowance can include this layer as well.

Optionally, however, with the upper 20 of the current embodiment, it is possible to close the lower portion of the upper by joining the lower peripheral allowance 29 directly with the sole 30. In such a construction, the sock liner 33 can be absent. The lower peripheral allowance 29 including the base material 40 and/or the exoskeleton 50 can be direct attached or molded directly to a midsole. By bonding the midsole 31 to these elements, the upper is securely joined with that midsole component. In such a construction, the midsole can form the footbed against which a wearer's foot directly engages. Accordingly, additional footbeds or other liners can be absent from the construction, which can further simplify the manufacture of the footwear and reduce the total number of components used to construct footwear.

Further optionally, in this alternative embodiment, the midsole 31 can be eliminated and the outsole 32 itself, provided it is of a sufficiently soft cushioning material, can be molded directly to the lower peripheral allowance 29 of the upper to join these components in a similar manner. A footbed (not shown) can be included in this construction over the outsole, or the upper surface of the outsole can form the footbed against which a wearer's foot directly engages.

Figure 6:
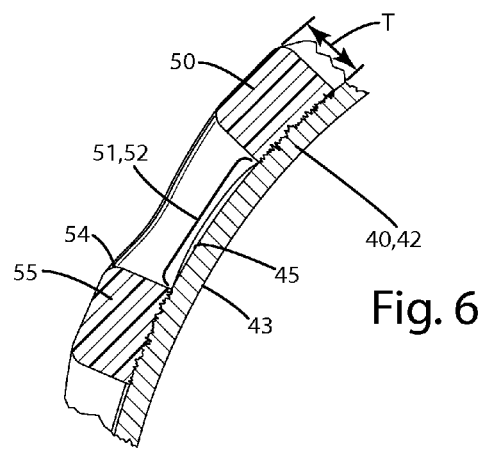
FIG. 6 is a close-up section view illustrating a sheet and an exoskeleton of the footwear.

Returning to the current embodiment shown in FIGS. 4-6, the sock liner 33 can extend upwardly and form upwardly and be joined with a lower surface 43 (FIG. 6) of the base material 40/sheet 42. If desired, the sock liner 33 can extend and be contiguous with the base material 40, or alternatively, it can be selectively positioned in discreet portions of the upper 20 and/or footwear 10. Further optionally, if desired, the sock liner 33 can be joined with the base material 40, when the base material 40 is in its sheet form 42 as shown in FIG. 7, for example, to form a laminate structure, if desired. Even further optionally, the sock liner 33 can be placed in the three-dimensional upper before or after it is placed in the last or at any other time in the manufacturing process. The sock liner can be joined with the base material 40, and in particular the lower surface 43 shown in FIG. 6 in any conventional manner. For example, it can be glued, stitched to, cemented to, or melted on the base material 40.

The exoskeleton 50, its construction and its association with the base material 40/sheet 42, will now be described in more detail. As shown in FIGS. 4 and 5, the exoskeleton 50 can define a plurality of holes also referred to as apertures 51. These apertures 51 are generally bounded around their edges by a portion of the exoskeleton. Within these apertures, the base material 40, and generally the upper surface 45 of the sheet 42 are exposed and fully visible. Within the apertures 51 of the exoskeleton 50, the exoskeleton generally is absent from the base material 40 and does not cover that base material 40 in those regions. These regions accordingly can form one or more aesthetic region in the finished footwear by virtue of the base material 40 being visible through the holes 51 defined in the exoskeleton. By aesthetic region, it is meant that the base material 40 is perceptibly different from the exoskeleton 50 in some manner. For example, the base material 40 in the aesthetic region 52 can be of a notably different material from the exoskeleton, and/or can be a different color, texture, shade, hue, reflectivity, transparency, translucency, and/or other property from the surrounding exoskeleton 50. In some cases the aesthetic regions 52 can include indicia such as text, images and/or combinations of different materials to provide a visual aesthetic effect. Generally, these aesthetic regions 52 and the corresponding holes 51 can be of an area optionally about at least one square centimeter, further optionally about at least two square centimeters, further optionally at least five square centimeters, further optionally at least ten square centimeters or more in size.

As shown in FIGS. 4 and 5, the holes 51 and aesthetic regions 52 can vary in size and shape. For example, in FIG. 4, the hole 51 and the corresponding aesthetic region 52 can be generally small, while in another portion of the footwear shown in FIG. 5, the hole 51 and corresponding aesthetic region 52 can be generally large. The holes 51 and aesthetic region 52 also can be of a variety of geometric shapes. For example, they can be irregular shapes or defined geometric shapes, such as full or partial triangles, squares, rectangles, circles, ellipses, pentagons, hexagons or other shapes depending on the application.

As shown in FIG. 1, the holes 51 and corresponding aesthetic regions 52 can generally be disposed on opposing sides of the exoskeleton where the exoskeleton forms at least one quarter strap 26. As another example, one or more holes 51/aesthetic regions 52 can be formed between the toe box and the heel counter. As another example, one or more holes 51/aesthetic regions 52 can be formed or defined in the exoskeleton between the eyelet cradle and the lower trim runner 28. Generally, the holes and aesthetic region can be located between any combination of first and second elements of the footwear 10.

Around the periphery of the aesthetic regions 52, and more generally the holes 51, the exoskeleton 50 can project upwardly and away from the upper surface 45 of the base material 40/sheet 42. The exoskeleton 50 can project upwardly and generally extend above the upper surface 45 for a predetermined thickness T (FIG. 6). This thickness can range from optionally about at least 0.1 millimeters to about 10.0 millimeters, further optionally about 0.5 millimeters to about 7.0 millimeters, further optionally about 4.0 millimeters. Further, the thickness T of the exoskeleton 50 can vary from region to region and/or component to component. For example, in areas of high wear near the toe, the thickness T can be greater than other thicknesses in other portions of the footwear, for example, at the quarter straps 26 or in regions over the forefoot.

Although the exoskeleton 50 as shown in FIGS. 4-6 generally has a square or rectangular cross section, that exoskeleton cross section can take on a variety of geometric shapes. For example, it can be fully or partially triangular, semicircular, trapezoidal or of other shapes. Further, the upper edges 54 of the exoskeleton which transition to the outer surface 55 of the exoskeleton can be chamfered, rounded, and/or angled, depending on the application.

The exoskeleton 50 can be constructed from a variety of polymeric materials, for example, thermoplastic polymers, thermoplastic polyurethane (TPU), ethyl vinyl acetate (EVA), polymer foams, such as polyurethane or ethyl vinyl acetate, polyvinyl chloride, polyurethanes, silicone, rubbers, liquid silicone rubber, combinations of the foregoing, and the like.

The exoskeleton 50 can form structural and/or aesthetic components of the footwear. For example, as mentioned above, where the exoskeleton 50 forms a quarter strap 26 or more generally a quarter of the footwear, it can add structural rigidity to the underlying base material 40, which may optionally be flexible and non-self supporting. The exoskeleton further can be selectively positioned to structurally reinforce and/or form certain components of the footwear. For example, as shown in FIGS. 1 and 4-5, the exoskeleton can form an eyelet cradle 24. This eyelet cradle can define one or more holes 25 to accommodate lacing or other structures to don the footwear and tighten it against a wearer's foot. The exoskeleton 50 also can form another component, such as a portion of a lower trim runner 28.

Optionally, the different components of the exoskeleton 50 can form one or more holes 51 and corresponding aesthetic regions 52 between the different components, for example, between the eyelet cradle 24 and the lower trim runner 28. In such a construction, the elements or components are separated by one or more exposed regions of the upper surface of the base material 40. Again, this results in visible aesthetic regions 52 between the visible various regions of the exoskeleton 50.

In some constructions of the footwear 10, one or more additional polymeric layers or other layers 60 can be added to selected portions of the exoskeleton 50 and/or base material 40/sheet 42. For example, as shown in FIGS. 4 and 5, an additional layer in the form of an eyelet cradle support element 60 is joined with the exoskeleton 50 in the region of the eyelet cradle 24. Likewise, another additional layer 60 can be added to a lower trim runner 28 of the exoskeleton 50. This additional layer can add structural reinforcement to these portions of the exoskeleton 50. For example, the eyelet support element can enhance the rigidity and tear resistance of the eyelet cradle 24 formed by the exoskeleton 50 and/or the base material 40/sheet 42. Optionally, the eyelet cradle support piece can define a hole 65 that aligns with the hole 25 in the eyelet cradle 24. In this manner, lacing, string or other straps or other elements can be placed through these holes, which is thereby reinforced by the additional support eyelet cradle support piece.

Where the exoskeleton 50 is sufficiently tear resistant or structurally rigid, or where it is desired that the exoskeleton be flexible or simply included as an aesthetic piece, the additional layer 60 can be absent. Although only a single additional layer 60 is shown, one, two, three or more layers may be added and joined on top of the exoskeleton 50 or the base material 40/sheet 42 depending on the application.

As shown in FIG. 5, while the additional layer 60 can be added directly or molded directly on the exoskeleton 50, it also can be molded directly on the base material 40/sheet 42 as shown adjacent the lower peripheral allowance 29.

Generally, the additional layer 60 can be constructed from a second polymeric material different from the first polymeric material from which the exoskeleton 50 is constructed. For example, the second polymeric material can have different properties from the first polymeric material such as color, shade, hue, durometer, chemical resistance, hardness, tear resistance, thickness, elasticity, density, combinations of the foregoing, and the like. Further additional layers, joined with the additional layer 60, the exoskeleton 50 and/or the base material 40/sheet 42, can likewise have different or similar properties as the second polymeric material and/or the first polymeric material.

As shown in FIGS. 6 and 9, the exoskeleton 50 bonds to embeds at least partially within the base material 40/sheet 42 in a relatively, sturdy, permanent manner. For example, as shown, the polymeric material 50A that forms the exoskeleton 50 bonds in a structural manner to the upper surface 45 of the base material 40/sheet 42. The polymeric material 50A embeds itself within the actual base material 40/sheet 42 generally permeating into the upper surface 45 and optionally the lower surface 43 thereof, extending around the various filaments and/or fibers or other elements from which the base material 40 is constructed at or near the upper surface, and optionally in some cases, deeper into the base material/sheet. This embedding of the polymeric material can enhance the physical and optionally chemical bond between the exoskeleton and the base material 40/sheet 42.

III. Method of Manufacture and Assembly

A method of manufacture and assembly of the footwear 10 will now be described with reference to FIGS. 6-11. In general, the base material 40, in the form of a flat sheet 42 is placed in a lower portion 101 of a mold 100 of an injection molding machine. The sheet 42 can be positioned so that it lays in a substantially flat orientation, that is, substantially only one plane. Of course, in certain applications, it may be oriented or configured so that it lays one or more planes, or lays on a slightly curved surface, in which case it still would be considered a substantially flat sheet of material. Optionally, the flat sheet 42 can generally be of a shape and size sufficient to form substantially all of a three-dimensional upper when the sheet and exoskeleton are positioned on a last.

The sheet 42 can be secured to the first portion 101 of the mold using any conventional mechanism. For example, it can be clamped in place or pinned in place on the first portion of the mold 101. Alternatively, it can be positioned in a recess, and/or drawn against the surface of the mold portion with a vacuum that prevents movement of the sheet. The second portion 102 of the mold can be positioned adjacent the flat sheet 42. The second portion 102 of the mold can include multiple runners and cavities that correspond to a desired exoskeleton 50 of the upper.

With the second mold portion 102 positioned adjacent the flat sheet 42, the injection mold 100 injects a first polymeric material 50A at a molding pressure through the mold and into the mold cavities 50C corresponding to the exoskeleton 50. The molding pressure of the injected first polymeric material can be at a level sufficient to satisfactorily inject the first polymeric material into all of the cavities and substantially form the exoskeleton 50. As an example, the molding pressure of the injection mold can be about 30 Kg/cm$^2$ to about 5 Kg/cm$^2$. The injection speed of the mold can be about 20 Kg/s to about 5 Kg/s. The first polymeric material can be fully injected into the cavities of the mold optionally within about 1 to 180 seconds, further optionally about 5 to 60 seconds, even further optionally within about 10 to 15 seconds. Generally, the temperature of the first polymeric material during the injection can be about 160° F. to about 180° F., or other temperatures depending on the material. The precise mold pressure, temperature and injection speed can vary throughout the mold cavities while the material is injected, and can also vary throughout the duration of the injection operation based on injection mold operating parameters.

In general, the molding pressure can be greater than the atmospheric pressure in the environment where the mold 100 is located. After the material is fully injected, the retained injection pressure can be about 25 Kg/cm$^2$ to about 5 Kg/cm$^2$, or other pressures depending on the material. The injection dwell time can be optionally about 10 seconds to about 180 seconds, optionally about 20 seconds to about 60 seconds, and further optionally about 30 seconds to about 40 seconds.

The polymeric material 50A is injected until the mold cavity forming the exoskeleton 50 is completely filled. The pressure is retained in the mold for a preselected amount of time, during which the polymeric material 50A can cure as described above. As the polymeric material 50A is injected, and while the pressure is retained, the exoskeleton can form its shape in various components. Further, as shown in FIG. 9, the material 50A can bond to and embed itself in the upper surface 45 of the flat sheet 42. Of course, in certain circumstances, the material 50A can embed beyond the upper surface 45 and, in certain cases, can bleed through to the opposite lower surface 43 of the sheet 42 if desired.

As the first polymeric material 50A is injected to form the exoskeleton 50, the holes 51 and corresponding aesthetic regions 52 of the upper 20 are formed where the polymeric material 50A generally does not contact and/or bond to the sheet 42.

After the exoskeleton 50 is sufficiently cooled and formed, the mold 100 can be opened, and the base sheet 42 with the corresponding exoskeleton 50 molded thereon can be removed. Optionally, the combined exoskeleton 50 and base material 40/sheet 42 can be trimmed to the desired size and configuration of the upper to be further constructed. Of course, in certain circumstances, the base sheet 40 can be perfectly trimmed to correspond to the shape and configuration of the exoskeleton so that no trimming or die cutting of excess material is performed.

With the flat sheet 42 and exoskeleton 50 optionally trimmed, these components can be placed adjacent a last 109. The sheet and exoskeleton can then be conformed to the three-dimensional contours of the last to generally form a three-dimensional upper. Before or after being placed on the last 109, the first and second ends 21 (FIG. 7) of the upper can be joined together. As mentioned above, with this particular embodiment, there is only a single joining of the upper at a single seam. Again, this can reduce labor costs, as additional time is not used performing various stitching operations on various components. Of course, in certain applications, there may be additional seams and components joined to construct the three-dimensional upper.

Figure 12:
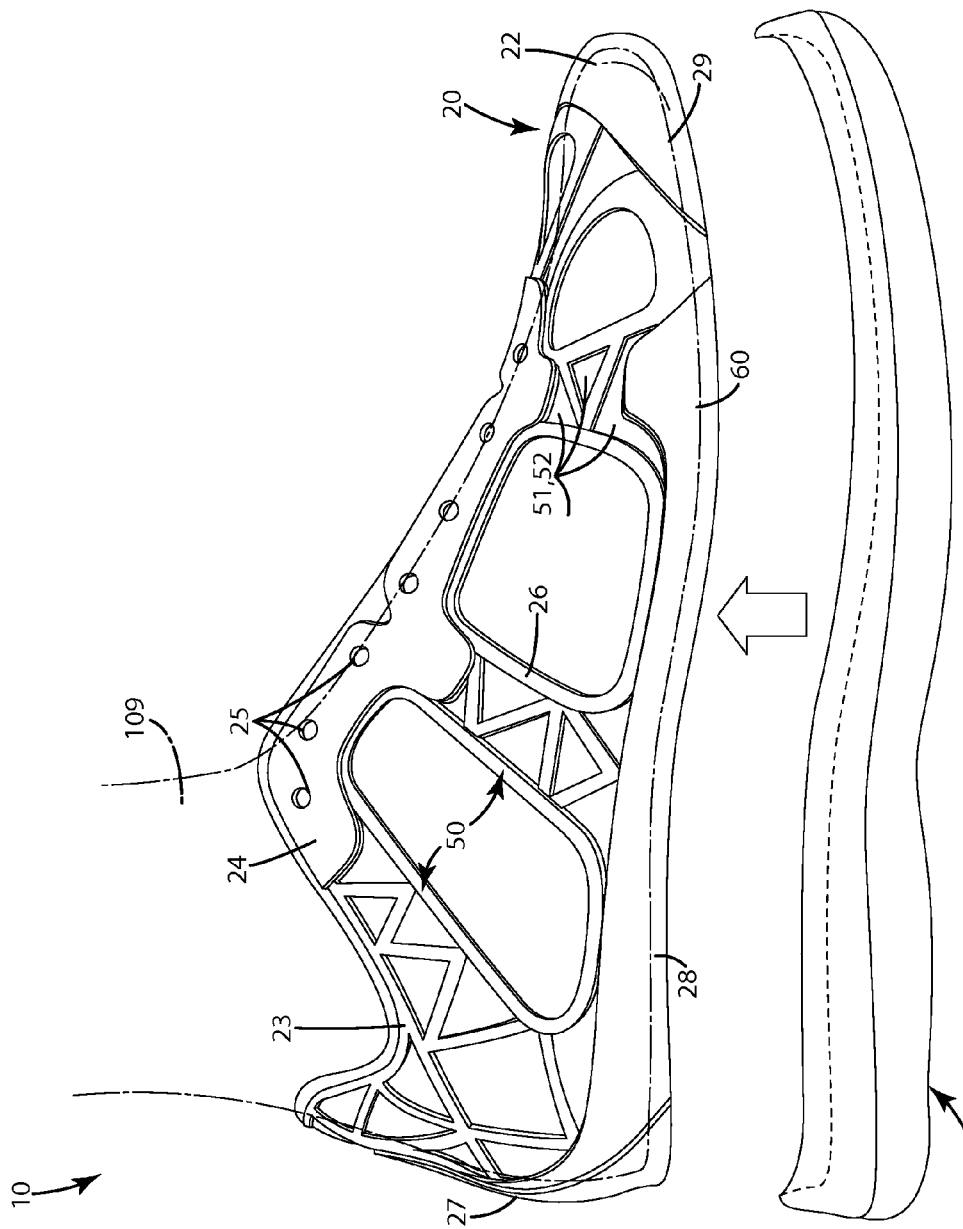
FIG. 12 is a side view of the sheet and exoskeleton conforming to a three-dimensional contour of a last.

Returning to FIG. 12, with the base material 40/sheet 42 and exoskeleton configured in the form of a three-dimensional upper, the upper is substantially closed, optionally with the exception of the opening for the foot and/or ankle of a wearer, and the lowermost opening defined by the peripheral allowance 29 of the upper. The three-dimensional upper shown in FIG. 12 can be joined with a sole component, such as a midsole and/or outsole by molding, cementing, fastening, direct attaching, or otherwise joining the same to the lower peripheral allowance 29. In certain applications, before the joining of the sole, the lower peripheral allowance 29 can be stitched to a liner via a Stroebel stitch to close the underside of the upper. In other applications, as mentioned above, the lower peripheral allowance 29 can remain free and can be molded directly to the sole 30 and its components, for example, a midsole and/or an outsole. In such a construction, the upper surface of the midsole can form the foot contacting surface of the sole. Accordingly, a footbed can be eliminated from the construction. Of course, if a footbed (not shown) is desired, it can be added.

After the sole 30 is joined with the three-dimensional upper 20, the footwear 10 can be removed from the last 109. Once removed from the last, a tongue, if not included in the exoskeleton 50 and/or base material 40/sheet 42, can be separately stitched, cemented, RF welded, HF welded, sonic welded, fastened with fasteners, or otherwise joined with the exoskeleton and/or base material 40/sheet 42. The footwear 10 can further be laced with lacing 70 being manually threaded through the respective eyelet cradle holes 25. Other finishing operations, such as trimming, polishing, removing flashing and the like can be performed to prepare the footwear for final packaging.

As described above, the exoskeleton 50 and/or base material 40/sheet 42 optionally can be reinforced or aesthetically enhanced by adding another layer 60. In such a construction as desired, after the exoskeleton 50 is injection molded on the base sheet 42, the combined exoskeleton 50 and base material 40/sheet 42 element can be placed in a mold as shown in FIGS. 10 and 11.

Another upper mold 105 can be positioned adjacent the exoskeleton and base material/sheet. This upper mold 105 can define mold cavities 60C corresponding to predetermined locations where a second polymeric material 60A and corresponding additional layer 60 is desired to be positioned. Generally, these cavities can be positioned so that they overlap at least a portion of the exoskeleton and/or base material/sheet. Like the first polymeric material, the second polymeric material can be injected in a molten liquid form into the upper mold 105 and end cavities 60C. During this injection, the material can be injected under the pressures, speeds and other parameters mentioned in connection with injecting the first polymeric material 50A.

For example, the second material can be injected at the mold pressure of about 30 Kg/cm$^2$ to about 5 Kg/cm$^2$ at a corresponding injection speed of about 20 Kg/s to about 5 Kg/s. The second material 60A can be injected until it generally completely fills the cavity 60C. Thereafter, the pressure can be retained so that the second polymeric material 60A can bond with the exoskeleton 50 and/or the base sheet 42. The pressure can be maintained for a dwell time of about 30 to about 40 seconds. After the material cools and forms the desired plastic shape, the upper mold 105 can be removed and the combined additional layer 60, exoskeleton 50 and base material 40/sheet 42 can be removed. If additional layers or third, fourth, fifth or more polymeric materials are desired, the above steps can be repeated to add those layers in preselected locations of the upper 20.

Figure 10:
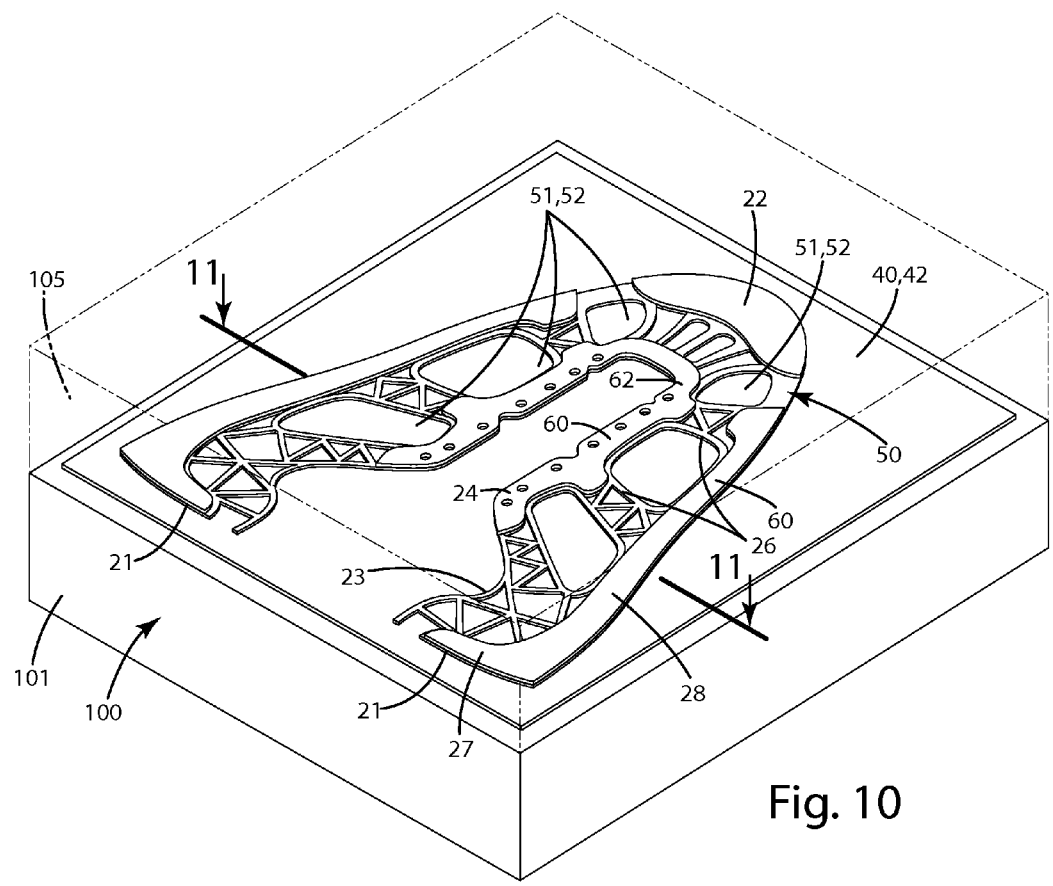
FIG. 10 is a perspective view of an additional layer being joined with the exoskeleton in a second mold.
Figure 11:
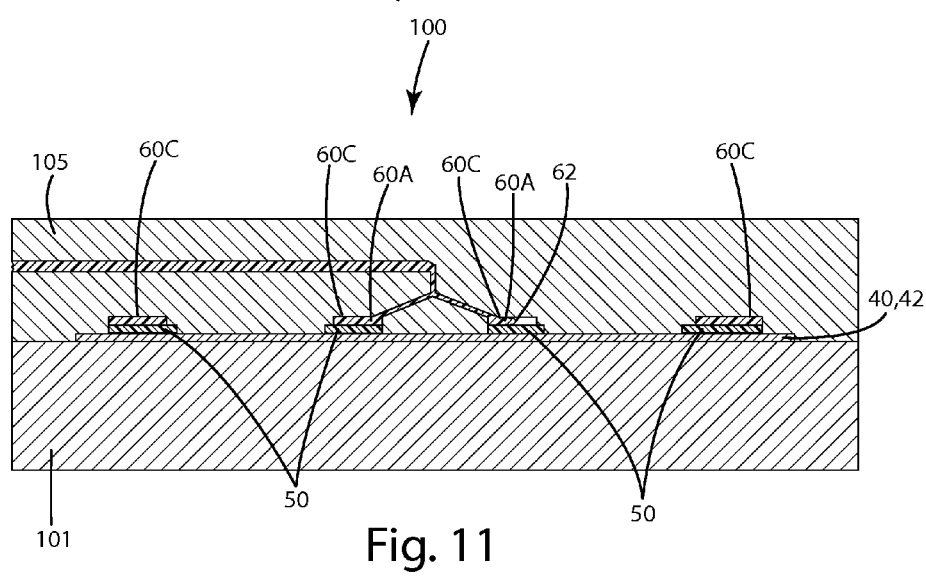
FIG. 11 is a section view of a second mold in which an additional layer is joined with the exoskeleton.

As shown in FIG. 10, the additional layer or second polymeric material can be added to in the region corresponding to the eyelet cradle to form an eyelet cradle support piece in the form of the additional layer 60. The additional layer or second polymeric material can also be added in the form of a lower trim runner to structurally reinforce the lower portion of the exoskeleton, which eventually is positioned adjacent the sole.

IV. First Alternative Embodiment

Figure 13:
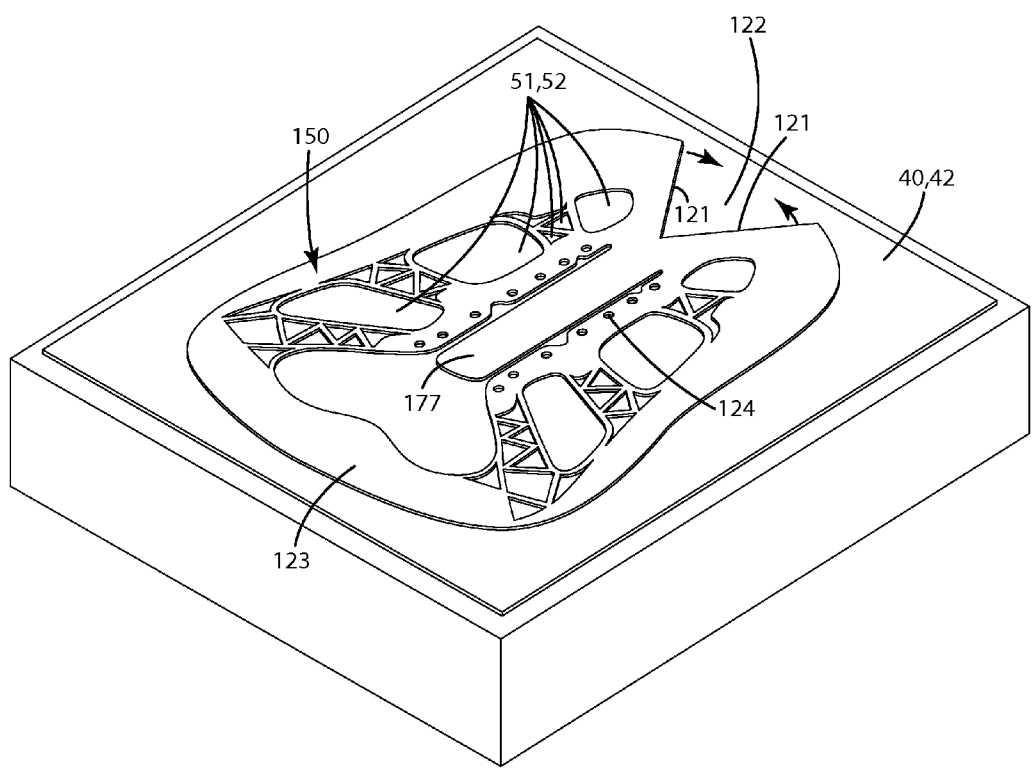
FIG. 13 is a perspective view of a first alternative embodiment of the footwear including the exoskeleton and the sheet of the footwear in a mold.

A first alternative embodiment of the footwear and related method of manufacture is illustrated in FIG. 13. This embodiment relates primarily to the construction of the exoskeleton and is similar to the embodiment described above with several exceptions. For example, the exoskeleton 150 is joined with the base material 40/sheet 42 in such a manner that the heel element 123 is completely surrounded by the exoskeleton 150. In contrast, the exoskeleton adjacent the toe box 122 defines a gap 122 that separates the marginal ends 121 of the exoskeleton 150 in a region corresponding to a toe box. With this construction, the seam that closes the finished upper, after the base material 140/sheet 142 and exoskeleton 150 are placed on the last, is located within the toe box 122 of the finished construction. Accordingly, this type of footwear differs from the current embodiment above in that the seam that substantially closes the upper is at the front of the footwear rather than the rear of the footwear. Of course, this embodiment could be further modified so that the seam is located on the quarters of the upper, or virtually anywhere around the perimeter of the upper.

The embodiment shown in FIG. 13 also differs from the current embodiment described above in that the exoskeleton 150 also defines and includes a tongue 177. If it is desired that the tongue be freely movable relative to the eyelet cradle, the tongue can be separated from the adjacent eyelet cradle 124 by trimming the tongue 177 and/or cutting the sheet 142 that spans between the tongue 177 and the eyelet cradle 124. Of course, if it is desired that the tongue 177 remain in place, and the base sheet 142 span between the eyelet cradle 124 and the tongue 177, the base sheet 142 can remain uncut.

V. Second Alternative Embodiment

Figure 14:
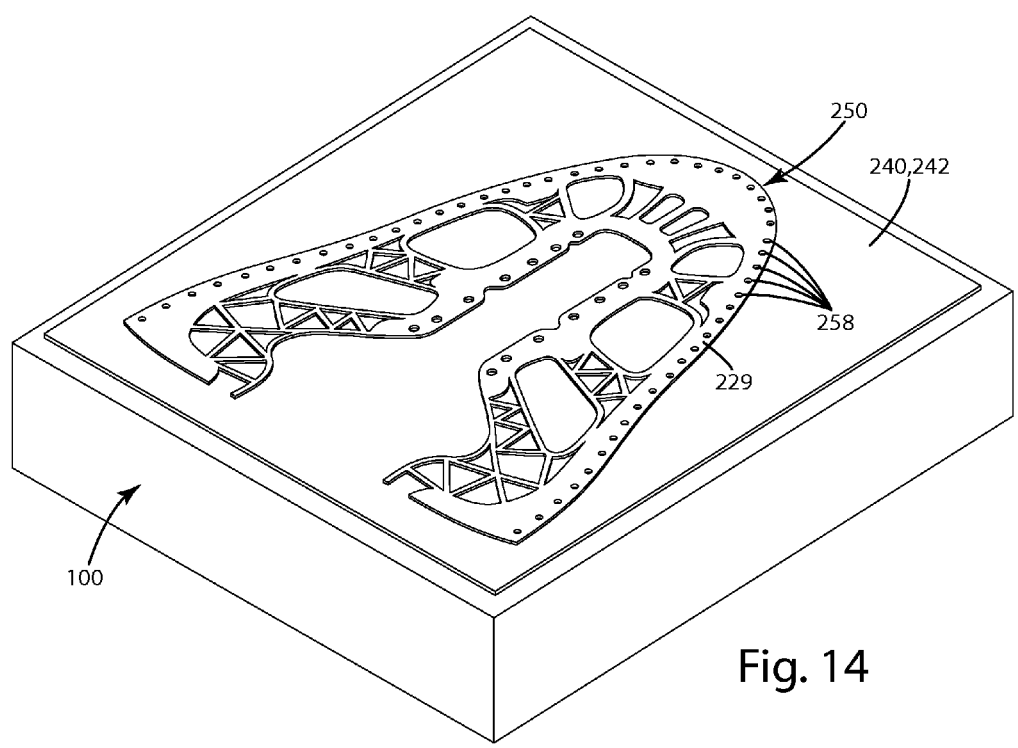
FIG. 14 is a perspective view of a second alternative embodiment of the footwear including the exoskeleton and the sheet of the footwear in a mold.
Figure 15:
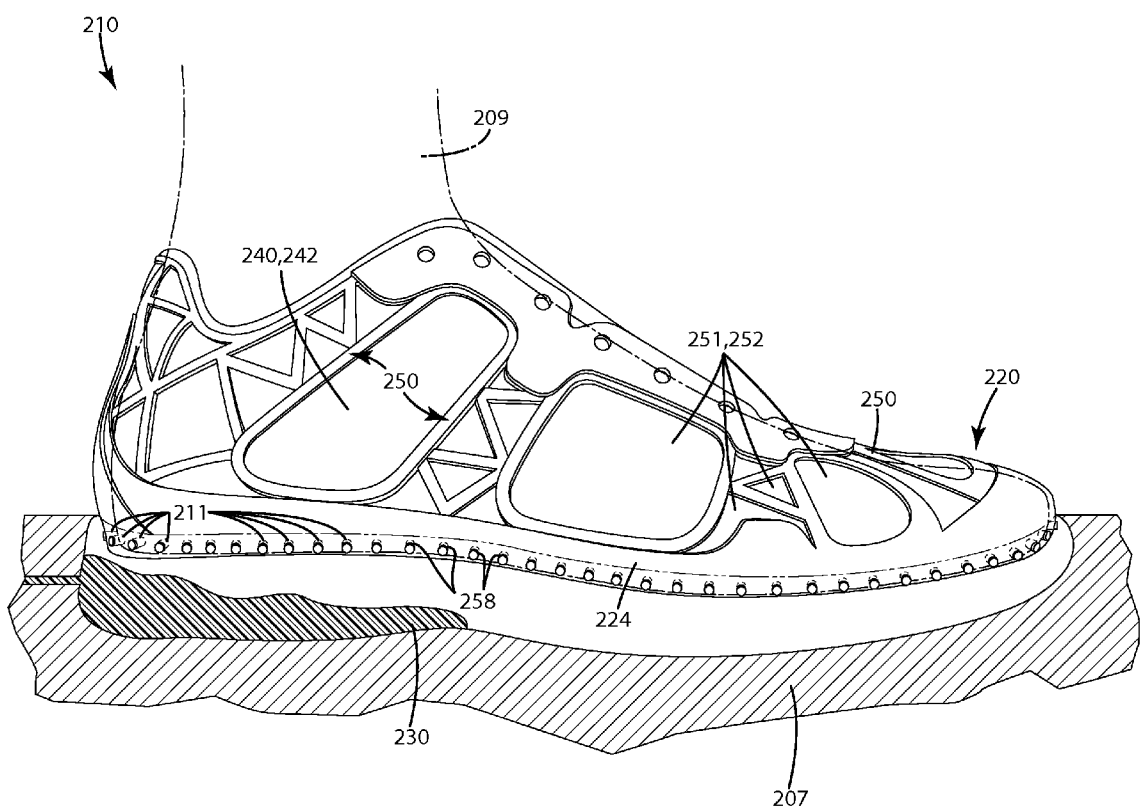
FIG. 15 is a side view of the second alternative embodiment of the footwear exoskeleton and sheet positioned on a last.

A second alternative embodiment of a method of manufacturing the footwear is illustrated in FIG. 14. The footwear and method of this embodiment are similar to the above embodiments with several exceptions. For example, when the exoskeleton 250 is molded, multiple dowel holes 258 are formed along a lower peripheral allowance 229 of the exoskeleton 250, or upper in general. When the exoskeleton 250 and the base material 240/sheet 242 are placed on the last 109 as shown in FIG. 15, the lower portion of the exoskeleton can be held in place by dowels 211 associated with the last 109 where the dowels project at least partially into and/or through the holes 258. In this manner, the exoskeleton 250 and base material 240/sheet 242 and more generally the three-dimensional upper 220, can be held in a fixed position relative to the last. While in this fixed position, an outsole mold 207 can be brought into proximity to the last 209 to mold a sole component, such as a midsole and/or outsole directly to the bottom of the exoskeleton 250 along the peripheral allowance 229. After the outsole 230 is molded and thoroughly joined with the upper 220, the outsole mold 207 can be moved away from the last 209, and the completed footwear 210, including the upper 220 and the sole 230, can be wrenched from the dowels 211, and thereby removed from the last 209. To further facilitate the removal, the dowels 211 can be of a length that does not significantly extend beyond the outer surface of the exoskeleton when the dowels 211 are placed in the holes 258 defined by the exoskeleton. After removal, the footwear can be finished as described above in connection with the other embodiments.

VI. Third Alternative Embodiment

Figure 16:
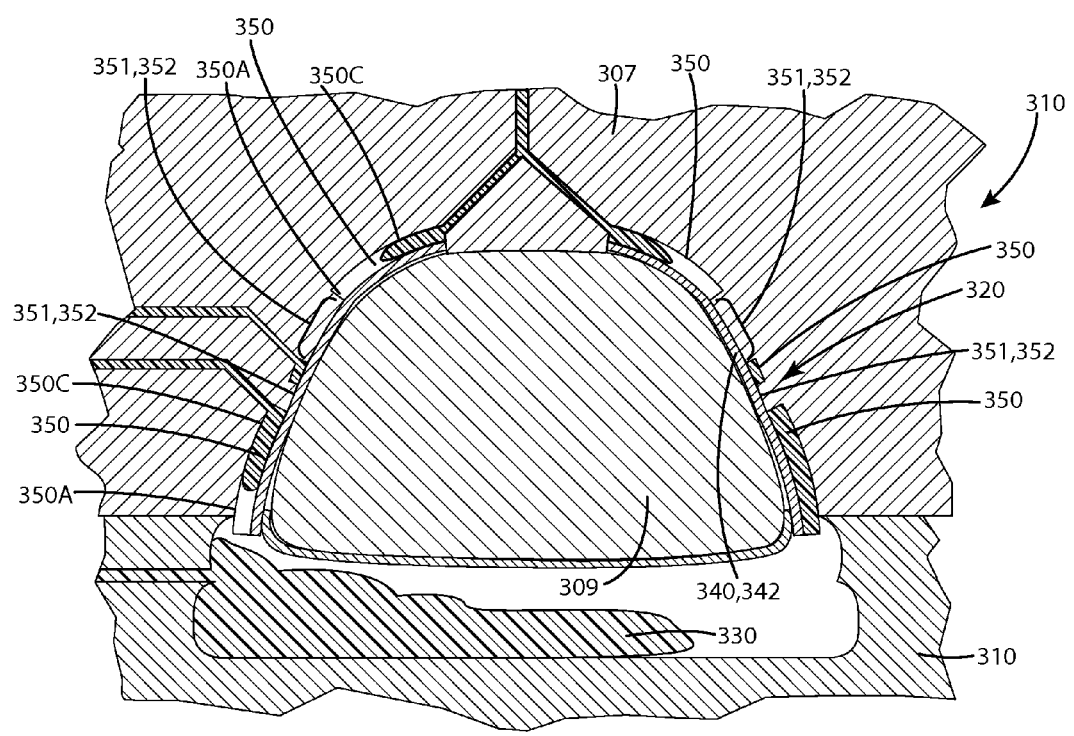
FIG. 16 is a section view of a third alternative embodiment of the footwear undergoing an exoskeleton molding operation directly on a last.

A third alternative embodiment of a method of manufacturing the footwear is illustrated in FIG. 16. The footwear and method of this embodiment are similar to the above embodiments with several exceptions. For example, the exoskeleton 350 can be molded to the sheet 342 while the sheet is contoured and/or conformed to a three-dimensional form on a last 309.

In general, a flat sheet 342 of base material 340, such as that described in the embodiments above, is provided. The flat sheet 342 is reconfigured and conformed to the three-dimensional contours of the last 309. A mold 307 is placed adjacent the three-dimensional contours of the last, with the base material 340/base sheet 342 located between the last and the mold. The mold 307 defines mold cavities 350C that correspond to the locations in which the exoskeleton 350 is desired to be formed on the base material 340/base sheet 342. A polymeric material 350A is injected at a molding pressure in the mold 307. The operating parameters of the mold 307 including temperatures, pressures and dwell times can be the same as that of the embodiments described above. The polymeric material 350A is allowed to completely fill all of the cavities 350C of the mold 307, embed and otherwise bond to the base material 340/base sheet 342 while the sheet is in the three-dimensional form shown in FIG. 16. The exoskeleton 350 also can be formed with one or more holes 351 and corresponding aesthetic regions 352 similar to that in the embodiments above.

After the exoskeleton 350 is joined with the base material 340/base sheet 342 and the upper 320 is generally formed in its three-dimensional configuration, another mold 309 can be positioned adjacent the last to form a sole 330, which can include midsole and outsole components such as those described in the embodiments above. After the upper 320 and sole 330 are joined, the footwear can be removed from the molds and the last and finished as described above in connection with the other embodiments.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of manufacturing footwear comprising:
    providing a substantially flat sheet of material having an upper surface and a lower surface;
    placing the flat sheet within a mold;
    injecting a first polymeric material, at a molding pressure, into the mold, on the flat sheet, already placed in the mold, with the flat sheet being in a planar configuration, so that the first polymeric material bonds to and at least partially embeds within the upper surface of sheet already placed in the mold, the first polymeric material thereby forming an exoskeleton that extends above the upper surface for a predetermined thickness, the exoskeleton defining a plurality of holes through which the upper surface of the sheet is visible so that the upper surface forms a plurality of aesthetic regions, at least one of the aesthetic regions having an area that is at least 1 square centimeter in size;
    conforming the flat sheet and exoskeleton from a two-dimensional flat form to a three-dimensional contour of a last to form a three-dimensional upper, the exoskeleton and the flat sheet forming substantially all of the three-dimensional upper; and
    joining the three-dimensional upper with a sole.

2. The method of claim 1 wherein the injecting step includes injecting the first polymeric material over the already placed flat sheet with the mold pressure in the range of about 30 kg/cm$^2$ to about 5 kg/cm$^2$.

3. The method of claim 2 wherein the eyelet cradle defines first holes, wherein a second polymeric material forms an eyelet reinforcing layer molded over the eyelet cradle, wherein the eyelet reinforcing layer defines second holes aligned with the first holes.

4. The method of claim 2 comprising extending lacing through eyelet holes defined by the eyelet cradle to lace-up the footwear.

5. The method of claim 1 comprising injection molding a second polymeric material on at least one of the flat sheet and the exoskeleton.

6. The method of claim 5 wherein the second polymeric material has a different durometer as compared to the first polymeric material.

7. The method of claim 1 wherein the first polymeric material is injection molded on the flat sheet in a first mold, comprising removing the flat sheet from the first mold, placing the flat sheet including the exoskeleton in a second mold, and injection molding a second polymeric material on at least one of the sheet and the exoskeleton in the second mold to form another component of the upper.

8. The method of claim 1 comprising injection molding a second polymeric material, different from the first polymeric material, on at least one of the sheet and the exoskeleton at a predetermined location to structurally reinforce the exoskeleton at the predetermined location.

9. The method of claim 1 comprising closing the three-dimensional upper by substantially only joining first and second ends of the three-dimensional upper along a single seam, and at least one of:
 stitching a sock liner to a peripheral allowance of the three-dimensional upper, and molding a sole directly to a peripheral allowance of the three-dimensional upper.

10. The method of claim 9 wherein the first and second ends are joined via at least one of RF welding, HF welding, sonic welding, stitching, stapling and cementing.

11. The method of claim 1 comprising closing the three-dimensional upper by substantially only joining first and second ends of the three-dimensional upper along a single seam, and molding a sole directly to a peripheral allowance of the three-dimensional upper.

12. The method of claim 11 comprising providing the mold with runners in communication with the mold cavity, and injecting the first polymeric material through the runners, into the empty part of the mold cavity.

13. The method of claim 1 comprising lacing the three-dimensional upper with lacing, the lacing passing through a plurality of eyelets defined by the exoskeleton.

14. The method of claim 1 comprising providing a plurality of runners in the mold and conveying the first polymeric material through the runners before said injecting step.

15. The method of claim 1 wherein the first polymeric material is injected into the mold and the mold pressure is maintained within the mold for a preselected amount of time, during which the first polymeric material cures.

16. The method of claim 1 wherein the sole is molded on the three-dimensional upper.

17. The method of claim 1 wherein flat sheet is substantially flexible and substantially non-self-supporting, wherein the structural exoskeleton supports the sheet in a contoured configuration in the three-dimensional upper.

18. The method of claim 1 comprising maintaining the mold pressure in the mold for a preselected amount of time, with the first polymeric material and flat sheet in the mold during the preselected amount of time.

19. The method of claim 18 wherein the mold pressure is about 30 kg/cm$^2$ to about 5 kg/cm$^2$.

20. The method of claim 1 wherein the flat sheet is larger than and extends beyond the exoskeleton, comprising trimming excess portions of the flat sheet after the injecting step.

21. The method of claim 1 comprising providing the mold with a mold cavity, placing the flat sheet in the mold cavity so that part of the mold cavity remains empty, and injecting the first polymeric material into the empty part of the mold cavity.

* * * * *